US012706358B2

(12) United States Patent
Lee et al.

(10) Patent No.: US 12,706,358 B2
(45) Date of Patent: Aug. 11, 2026

(54) SECONDARY BATTERY

(71) Applicant: Samsung SDI Co., Ltd., Yongin-si (KR)

(72) Inventors: Hyun Soo Lee, Yongin-si (KR); Min Hyung Guen, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 627 days.

(21) Appl. No.: 18/251,515

(22) PCT Filed: Oct. 22, 2021

(86) PCT No.: PCT/KR2021/014898

§ 371 (c)(1),
(2) Date: May 2, 2023

(87) PCT Pub. No.: WO2022/108139

PCT Pub. Date: May 27, 2022

(65) Prior Publication Data

US 2024/0006730 A1 Jan. 4, 2024

(30) Foreign Application Priority Data

Nov. 19, 2020 (KR) ........................ 10-2020-0155852

(51) Int. Cl.
*H01M 50/562* (2021.01)
*H01M 50/103* (2021.01)
(Continued)

(52) U.S. Cl.
CPC ....... *H01M 50/562* (2021.01); *H01M 50/103* (2021.01); *H01M 50/15* (2021.01); *H01M 50/176* (2021.01); *H01M 50/188* (2021.01)

(58) Field of Classification Search
CPC .. H01M 50/562; H01M 50/15; H01M 50/103; H01M 50/176; H01M 50/188
See application file for complete search history.

(56) References Cited

U.S. PATENT DOCUMENTS 8,828,596 B2 9/2014 Byun et al.
10,062,894 B2 8/2018 Kim et al.
(Continued)

FOREIGN PATENT DOCUMENTS

EP 3104431 A1 12/2016
KR 10-2009-0081197 A 7/2009
(Continued)

OTHER PUBLICATIONS

EPO Extended European Search Report dated Dec. 3, 2024, issued in corresponding European Patent Application No. 21894911.3, 9 pages.

(Continued)

*Primary Examiner* — Sarah A. Slifka
(74) *Attorney, Agent, or Firm* — Womble Bond Dickinson (US) LLP

(57) ABSTRACT

The present invention provides a secondary battery having enhanced durability, reinforced cap plate stiffness and reduced cell weight. Disclosed as an example is a secondary battery having: an electrode assembly; a case for accommodating the electrode assembly; a cap plate coupled to the case to seal the electrode assembly; a terminal connected to the electrode assembly and exposed through the cap plate; and a protrusion protruding toward the terminal in the area in which the terminal of the cap plate is coupled.

19 Claims, 4 Drawing Sheets

(51) Int. Cl.

| | |
|---|---|
| ***H01M 50/15*** | (2021.01) |
| ***H01M 50/176*** | (2021.01) |
| ***H01M 50/188*** | (2021.01) |

(56) References Cited

U.S. PATENT DOCUMENTS

| | | | |
|---|---|---|---|
| 2009/0186269 | A1 | 7/2009 | Kim et al. |
| 2011/0039152 | A1 | 2/2011 | Kim et al. |
| 2011/0311863 | A1 | 12/2011 | Byun et al. |
| 2016/0099445 | A1 | 4/2016 | Park et al. |
| 2016/0260959 | A1 | 9/2016 | Guen |
| 2016/0380246 | A1 | 12/2016 | Kim et al. |
| 2020/0091492 | A1 | 3/2020 | Guen |

FOREIGN PATENT DOCUMENTS

| | | | |
|---|---|---|---|
| KR | 10-2011-0018260 | A | 2/2011 |
| KR | 10-2011-0137005 | A | 12/2011 |
| KR | 10-1116492 | B1 | 2/2012 |
| KR | 10-1222336 | B1 | 1/2013 |
| KR | 10-2015-0144600 | A | 12/2015 |
| KR | 10-2016-0042246 | A | 4/2016 |
| KR | 10-2017-0000442 | A | 1/2017 |
| KR | 10-1711977 | B1 | 3/2017 |
| KR | 10-2019-0098494 | A | 8/2019 |
| KR | 10-2020-0032987 | A | 3/2020 |

OTHER PUBLICATIONS

International Search Report of PCT/KR2021/014898, Jan. 28, 2022, 5 pp.

Korean Office Action corresponding to KR Application No. 10-2020-0155852, dated Oct. 27, 2025 (6 pages).

SECONDARY BATTERY

CROSS-REFERENCE TO RELATED APPLICATIONS

This application is a U.S. National Phase Patent Application of International Application Number PCT/KR2021/014898, filed on Oct. 22, 2021, which claims priority to Korean Patent Application Number 10-2020-0155852, filed on Nov. 19, 2020, the entire content of each of which is incorporated herein by reference.

TECHNICAL FIELD

The present invention relates to a secondary battery capable of withstanding the pressure of gas generated inside a cell.

BACKGROUND ART

A secondary battery is a power storage system that converts electric energy into chemical energy and stores the converted energy to provide high energy density. Unlike primary batteries that cannot be recharged, a secondary battery is rechargeable and is being widely used in IT devices, such as a smart phone, a cellular phone, a notebook computer, or a tablet PC. In recent years, electric vehicles are drawing attention for protection of environmental contamination, and a trend toward the use of high-capacity secondary batteries for electric vehicles is growing. The secondary battery needs to have high density, high output and stability characteristics.

The above information disclosed in this Background section is intended only for enhancement of understanding of the background of the invention, and thus may contain information that does not constitute prior art.

DESCRIPTION OF EMBODIMENTS

Technical Problem

The present invention provides a secondary battery having enhanced durability, reinforced cap plate stiffness and reduced cell weight.

Solution to Problem

A secondary battery according to the present invention comprises: an electrode assembly; a case for accommodating the electrode assembly; a cap plate coupled to the case to seal the electrode assembly; a terminal connected to the electrode assembly and exposed through the cap plate; and a protrusion protruding toward the terminal in the area in which the terminal of the cap plate is coupled.

Here, the protrusion of the cap plate may be formed along the periphery of the terminal passing through the cap plate.

In addition, a charging member interposed between the cap plate and the terminal may be included.

In addition, the charging member may include a first protrusion protruding downward and coupled to an inner side of the protrusion of the cap plate.

In addition, the first protrusion of the charging member may be coupled to a through-hole of the cap plate through which the terminal passes, inside the protrusion of the cap plate.

In addition, the first protrusion of the charging member may include an inner surface in contact with a sealing gasket formed in the terminal or around the terminal.

In addition, the charging member may include a second protrusion protruding upward along an edge thereof.

In addition, the second protrusion of the charging member may surround a lower portion of a side surface of the terminal plate exposed at an upper portion of the terminal to accommodate at least a portion of the terminal plate.

In addition, the cap plate includes a groove corresponding to a height of the protrusion with respect to a lower region of the protrusion, and the sealing gasket coupled to the terminal may be coupled to the groove at a lower portion of the protrusion.

In addition, the charging member may include a polymer and a conductive filler, and the polymer may include any one selected from the group consisting of polyphenylene sulfide (PPS), polyacetyl (PA), polyphenylene vinylene (PPV), polypyrole (PPY), PANI (polyaniline), PT (polythiophene), and poly 3,4-etylenedioxythiophene (PEDOT), and the conductive filler may include any one selected from carbon black, carbon fiber, and carbon nanotube, or a combination thereof.

Advantageous Effects of Disclosure

In the secondary battery according to the present invention, since a case is charged to a positive electrode by a high-resistance charging member, an alloy (for example, lithium aluminum (LiAl) alloy) may not be formed on the inner surface of the case by an electrolyte, thereby increasing durability, and even when a negative electrode is short-circuited, the charging member may consume energy, thereby preventing ignition of the secondary battery.

In addition, the secondary battery according to the present invention may secure a rigid structure against bending and deformation of a cap plate by forming a coupling protrusion on the cap plate.

In addition, the secondary battery according to the present invention may reduce the thickness of a terminal plate, thereby reducing the weight of a cell.

BRIEF DESCRIPTION OF THE DRAWINGS

Figure 1:
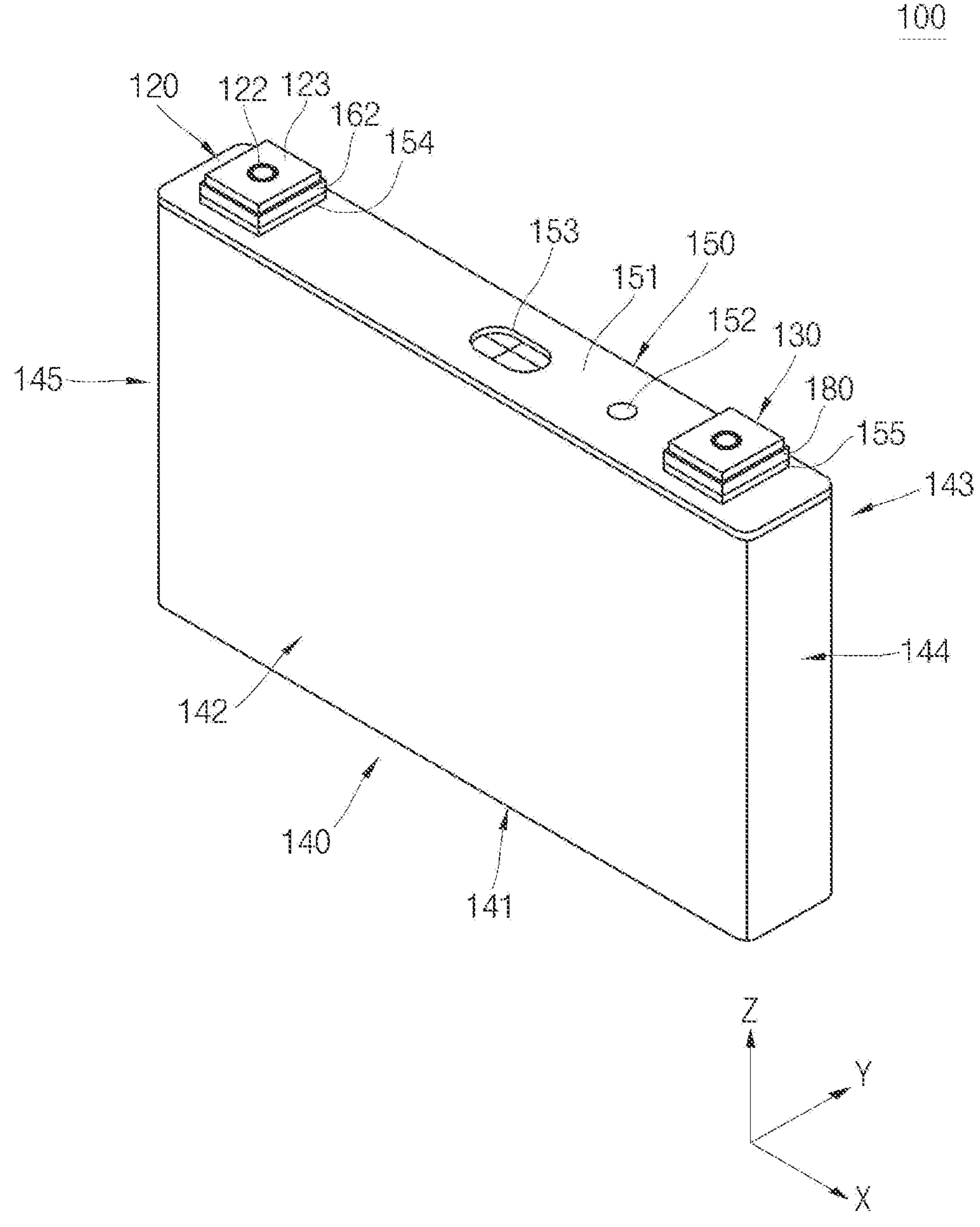
FIG. 1 is a perspective view illustrating an exemplary secondary battery according to an embodiment of the present invention.

100: Secondary battery 110: Electrode assembly
120: First terminal 130: Second terminal
140: Cap assembly 150: Cap assembly
151: Cap plate 180: Charging Member
181: First protrusion 182: Inner surface
183: Second protrusion

BEST MODE

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

Although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

FIG. 1 is a perspective view illustrating an exemplary secondary battery according to an embodiment of the present invention.

In the example shown in FIG. 1, the secondary battery 100 may include electrode assemblies 110 and 210 (see FIGS. 3 and 4), a first terminal 120, a second terminal 130, a case 140, and a cap assembly 150.

In some examples, the first and second terminals 120 and 130 may penetrate through the cap assembly 150 and be exposed upwardly. In some examples, the first terminal 120 may comprise or be referred to as a negative terminal, and the second terminal 130 may comprise or be referred to as a positive terminal.

In some examples, an upper insulating member 162 may be interposed between the first terminal 120 and the cap assembly 150, and a charging member 180 may be interposed between the second terminal 130 and the cap assembly 150. Accordingly, the first terminal 120 and the cap assembly 150 may be electrically insulated (that is, separated) from each other. In addition, the second terminal 130 and the cap assembly 150 may be electrically connected (that is, connected) to each other, and accordingly, the case 140 may be charged with, for example, a positive electrode (or a negative electrode).

In some examples, the case 140 may be formed by a deep drawing process using a metal plate or by a bending and welding process using a metal plate, may have a substantially hexahedral shape that accommodates the electrode assemblies 110 and 120 and has a space in which the cap assembly 150 can be seated. In some examples, the case 140 may include a rectangular bottom portion 141 having long sides and short sides, long side portions 142 and 143 bent and extended from each long side of the bottom portion 141 toward the cap assembly 150, and short side portions 144 and 145 extended from each short side of the bottom portion 141 toward the cap assembly 150. In some examples, the case 140 may comprise or be referred to as a case, housing, or exterior material.

In some examples, the cap assembly 150 may include a cap plate 151, a plug 152, and a safety vent 153, which will be explained again below.

Figure 2:
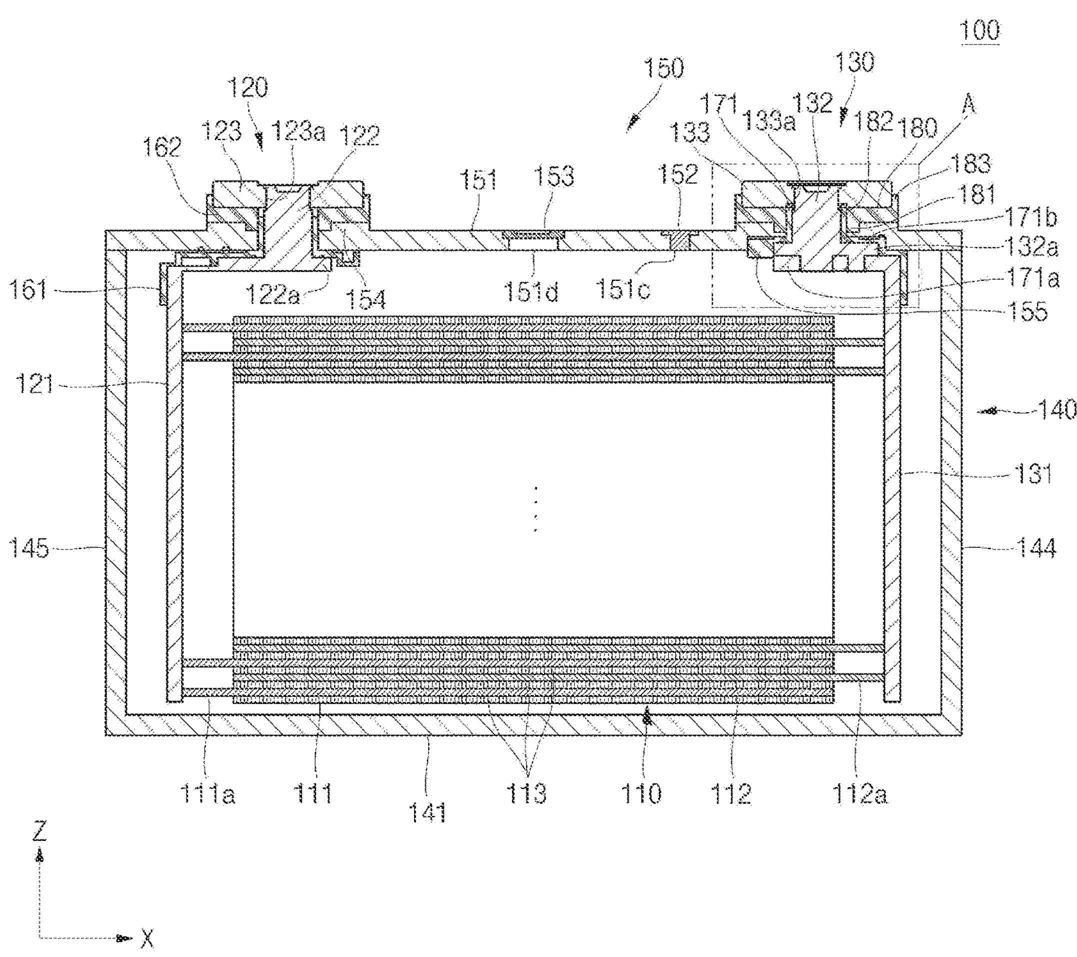
FIG. 2 is a cross-sectional view illustrating the exemplary secondary battery shown in FIG. 1.
Figure 3:
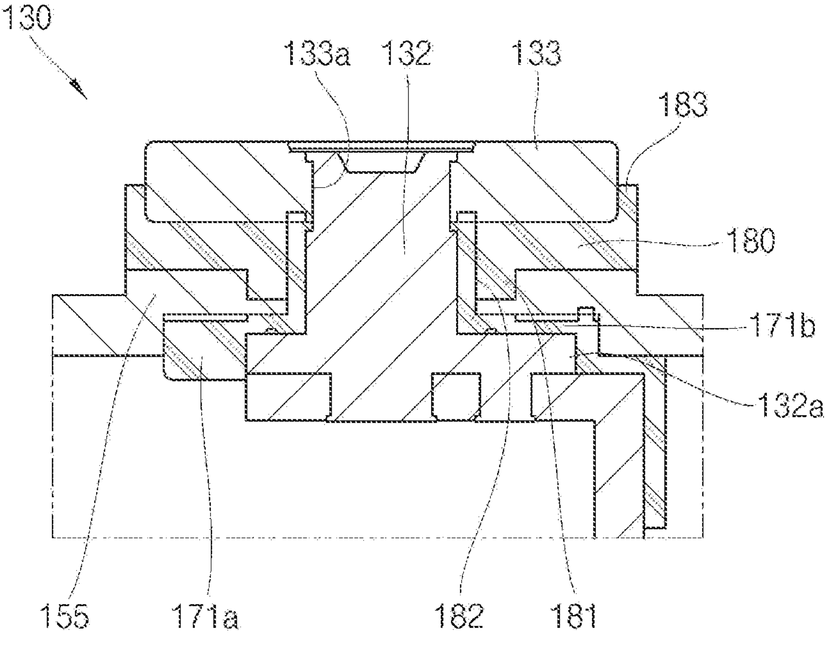
FIG. 3 is an enlarged view of a portion A of FIG. 2.

FIG. 2 is a cross-sectional view illustrating the exemplary secondary battery shown in FIG. 1. FIG. 3 is an enlarged view of a portion A of FIG. 2.

First, as shown in FIG. 2, the secondary battery 100 may include an electrode assembly 110 having a winding axis in the horizontal direction (that is, a direction substantially parallel to the longitudinal direction of the cap assembly 150). In some examples, the electrode assembly may include a stack type as well as a wound type.

The electrode assembly 110 may be formed by winding or stacking a stack of the first electrode plate 111, the separator 113, and the second electrode plate 112, which are formed in a thin plate shape or a film shape. In some examples, the first electrode plate 111 may serve as a negative electrode, and the second electrode plate 112 may serve as a positive electrode, Of course, the reverse is also possible. In some examples, the first electrode plate 111 is formed by applying a first electrode active material, such as graphite or carbon, to a first electrode current collector formed of a metal foil, such as copper, a copper alloy, nickel, or a nickel alloy, and may include a first electrode uncoated portion 111*a* that is a region to which the first electrode active material is not applied. In some examples, the second electrode plate 112 is formed by applying a second electrode active material, such as a transition metal oxide, to a second electrode current collector formed of a metal foil, such as aluminum or an aluminum alloy, and may include a second electrode uncoated portion 112*a* that is a region to which the second electrode active material is not applied. In some examples, the separator 113 is positioned between the first electrode plate 111 and the second electrode plate 112 to prevent a short circuit and to enable the movement of lithium ions, and may include polyethylene, polypropylene, or a composite film of polyethylene and polypropylene. In addition, the separator 113 may include a functional film coated with an inorganic material layer on a porous polymer film. In addition, the separator 113 may be replaced with an inorganic solid electrolyte, such as a sulfide-based, oxide-based or phosphate compound-based electrolyte that does not require a liquid or gel electrolyte. The first terminal 120 and the second terminal 130, which are electrically connected to the first electrode plate 111 and the second electrode plate 112, respectively, may be positioned at both ends of the electrode assembly 110. In some examples, the electrode assembly 110 may be accommodated in the case 140 together with an electrolyte. In some examples, the electrolyte may include a lithium salt such as $LiPF_6$, in an organic solvent, such as ethylene carbonate (EC), dimethyl carbonate (DMC), diethyl carbonate (DEC), or ethyl-methyl carbonate (EMC). In addition, the electrolyte may be in a liquid or gel form. In some examples, when an inorganic solid electrolyte is used, the electrolyte may be omitted.

The first terminal 120 may be formed of a metal and may be electrically connected to the first electrode plate 111. In some examples, the first terminal 120 may include a first current collecting plate 121, a first terminal pillar 122, and a first terminal plate 123.

In some examples, the first electrode current collector 121 may be in contact with the first electrode uncoated portion 111*a* protruding from one end of the electrode assembly 110. Practically, the first electrode current collector 121 may be welded to the first electrode uncoated portion 111*a*. In some examples, the first electrode current collector 121 may be formed in an approximately 'L.' shape. In some examples, the first electrode current collector 121 may be integrally formed with the first terminal pillar 122, or the first terminal pillar 122 may be separately provided to be riveted and/or welded to the first electrode current collector 121, In some examples, the first electrode current collector 121 may be made of copper or a copper alloy.

In some examples, the first terminal pillar 122 may protrude and extend to an upper portion through a cap plate 151, which will be described later, and may be electrically connected to the first electrode current collector 121 from a lower portion of the cap plate 151. In addition, in some examples, the first terminal pillar 122 may include a flange 122*a* extending along the length direction of the cap plate 151 to prevent the first terminal pillar 122 from falling out. The first terminal pillar 122 may be integrally formed with the first electrode current collector 121, or may be riveted and/or welded after being inserted into the first electrode current collector 121. In some examples, the first terminal pillar 122 may be electrically insulated from the cap plate 151. In some examples, the first terminal pillar 122 may be made of copper, a copper alloy, aluminum, or an aluminum alloy. The first terminal plate 123 may include a hole 123*a*, and the first terminal pillar 122 may be coupled to the hole 123*a* and riveted and/or welded thereto. In some examples, the interface between the upwardly exposed first terminal pillar 122 and the first terminal plate 123 may be welded to each other. For example, by providing laser beams to a boundary region of the upwardly exposed first terminal pillar 122 and the first terminal plate 123, the boundary region may be melted and then cooled, so that the first terminal pillar 122 and the first terminal plate 123 are coupled to each other. In some examples, a bus bar (not shown) formed of aluminum or an aluminum alloy may be welded to the first terminal plate 123, and thus a plurality of secondary batteries can be connected in series or in parallel.

The second terminal 130 may also be formed of a metal and may be electrically connected to the second electrode plate 112. In some examples, the second terminal 130 may include a second current collecting plate 131, a second terminal pillar 132, and a second terminal plate 133. The second current collecting plate 131 may be in contact with the second electrode uncoated portion 112*a* protruding from one end of the electrode assembly 110. In some examples, the second current collecting plate 131 may be formed in an approximately shape. In some examples, the second terminal pillar 132 is integrally formed with the second current collector plate 131, or the second terminal pillar 132 is separately provided to be fitted and coupled to the second current collector plate 131. The second current collector plate 131 may be made of, for example, but not limited to, aluminum or an aluminum alloy.

The second terminal pillar 132 may protrude and extend upward a predetermined length through a cap plate 151, which will be described later, and may be electrically connected to the second current collector plate 131 from a lower portion of the cap plate 151. The second terminal pillar 132 may include a flange 132*a* that protrudes and extends to an upper portion of the cap plate 151 by a predetermined length, and may prevent the second terminal pillar 132 from falling out of the lower portion of the cap plate 151. In the second terminal pillar 132, a region positioned below the flange 132*a* may be inserted into the second current collecting plate 131 and then riveted and/or welded. In some examples, the second terminal pillar 132 may be made of aluminum or an aluminum alloy.

The second terminal plate 133 may include a hole 133*a*, and may be coupled to the second terminal pillar 132 in the hole 133*a*. In addition, the second terminal pillar 132 and the second terminal plate 133 may be riveted and/or welded to each other. In some examples, a boundary region of the upwardly exposed second terminal pillar 132 and the second terminal plate 133 may be welded to each other. For example, by providing laser beams to the boundary region between the upwardly exposed second terminal pillar 132 and the second terminal plate 133, the boundary regions may be melted and cooled, so that the second terminal pillar 132 and the second terminal plate 133 are coupled to each other. In addition, a bus bar (not shown) formed of aluminum or an aluminum alloy may be welded to the second terminal plate 133, and thus a plurality of secondary batteries can be connected in series or in parallel. In some examples, the second terminal plate 133 may be electrically connected to the cap plate 151, so that the cap plate 151 and the case 140 described below have the same polarity as the second terminal 130 (for example, positive polarity).

The cap assembly 150 may be coupled to the case 140. In some examples, cap assembly 150 may comprise or be referred to as cap plate 151. The cap plate 151 seals the space of the case 140, and may be formed of the same material as the case 140. In some examples, the cap plate 151 may be coupled to the case 140 by laser welding. In some examples, since the cap plate 151 may have the same polarity as the second terminal 130 as described above, the cap plate 151 and the case 140 may have the same polarity. In some examples, the cap plate 151 may include a through-hole through which the first terminal pillar 122 and the second terminal pillar 132 respectively pass. In some examples, the cap plate 151 may further include an injection hole 151*c* into which the electrolyte is injected and a vent hole 151*d* in which a safety vent is installed. In some examples, a plug 152 may block the injection hole 151*c* to prevent the electrolyte contained in the case 140 from leaking. In some examples, the plug 152 may be laser-welded to the cap plate 151 after being coupled to the injection hole 151*c*, In some examples, the safety vent 153 blocks the vent hole 151*d*, and, when the internal pressure of the case 140 is higher than a set pressure, the high-pressure gas inside may be discharged to the outside. In some examples, the safety vent 153 may be coupled to the vent hole 151*d* and then laser-welded to the cap plate 151.

In some examples, an insulating seal gasket 161 may be interposed between the first terminal pillar 122 and the through-hole of the cap plate 151. That is, the seal gasket 161 is formed inside the through-hole of the cap plate 151, and the first terminal pillar 122 may protrude upward through the through-hole of the seal gasket 161.

In some examples, a lower insulating member 162 may be interposed between the first electrode current collector 121 and the cap plate 151. In addition, in some examples, the upper insulating member 162 may be interposed between the first terminal plate 123 and the cap plate 151. Accordingly, the first terminal 120 may be electrically insulated (separated) from the cap plate 151.

In some examples, an insulating seal gasket 171 may be interposed between the second terminal pillar 132 and the through-hole of the cap plate 151. That is, the seal gasket 171 is formed inside the through-hole of the cap plate 151, and the second terminal pillar 132 may protrude upward through a through-hole 171*a* of the seal gasket 171. In addition, in some examples, the charging member 180 may be interposed between the second terminal plate 133 and the cap plate 151. Accordingly, the second terminal 130 may be electrically connected to the cap plate 151.

In addition, the cap plate 151 may have protrusions 154 and 155 protruding upward with respect to regions where the first terminal 120 and the second terminal 130 are formed, respectively.

The first protrusion 154 of the cap plate 151 may be formed to correspond to the insulating member 162 of the first terminal 120. The first protrusion 154 may be formed along the periphery of the first terminal pillar 122 of the first terminal 120, and may protrude upward from the cap plate 151. In addition, the insulating member 162 is coupled to the upper portion of the first protrusion 154, and the insulating member 162 is formed to contact the seal gasket 161 to maintain airtightness. In addition, the insulating member 162 is formed to surround the lower side of the upper first terminal plate 123, the insulating member 162 and the first terminal plate 123 coupled from the first protrusion 154 of the cap plate 151 may be firmly coupled to each other. In addition, the cap plate 151 can secure a thickness in the region where the first terminal 120 is coupled through the first protrusion 154, thereby preventing deformation or bending of the cap plate 151.

In addition, the second protrusion 155 of the cap plate 151 may be formed to correspond to the charging member 180 of the second terminal 130. The second protrusion 155 may be formed along the periphery of the second terminal pillar 132 of the second terminal 130, and may protrude upward from the cap plate 151. In addition, the charging member 180 is coupled to the upper portion of the second protrusion 155, and the charging member 180 is formed to contact the seal gasket 171 to maintain airtightness. In addition, the charging member 180 is formed to surround the lower side of the upper second terminal plate 123, so that the charging member 180 and the second terminal plate 133 coupled from the second protrusion 155 of the cap plate 151 may be firmly coupled to each other.

Meanwhile, the second protrusion 155 may be formed by forging the cap plate 151. In this case, a groove corresponding to a protruding height of the second protrusion 155 may be formed in a region of the cap plate 151 located under the second protrusion 155. In addition, when the seal gasket 171 is coupled to the corresponding groove, a fastening force of the second terminal 130 to the cap plate 151 may be improved.

In addition, the cap plate 151 can secure a thickness in the region where the second terminal 130 is also coupled through the second protrusion 155, thereby preventing deformation or bending of the cap plate 151.

Figure 4:
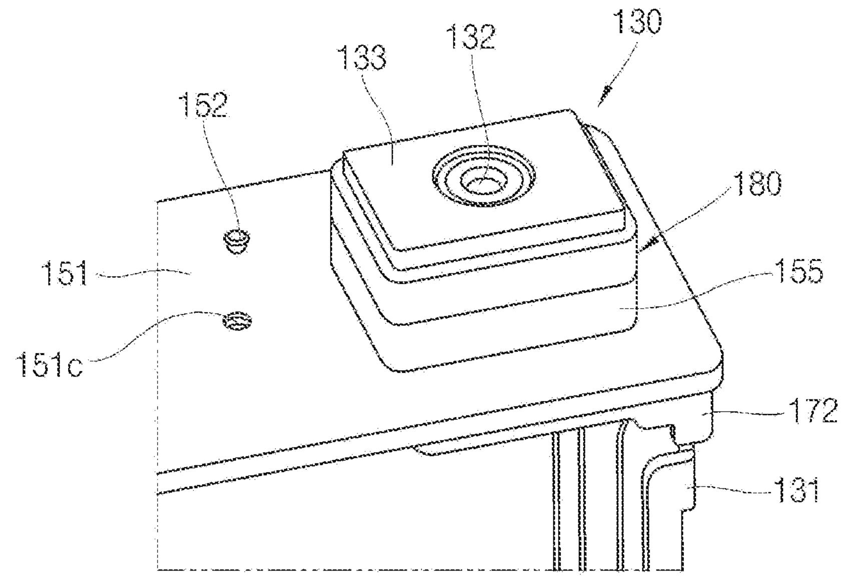
FIG. 4 is a partial perspective view of an exemplary secondary battery according to an embodiment of the present invention.
Figure 5:
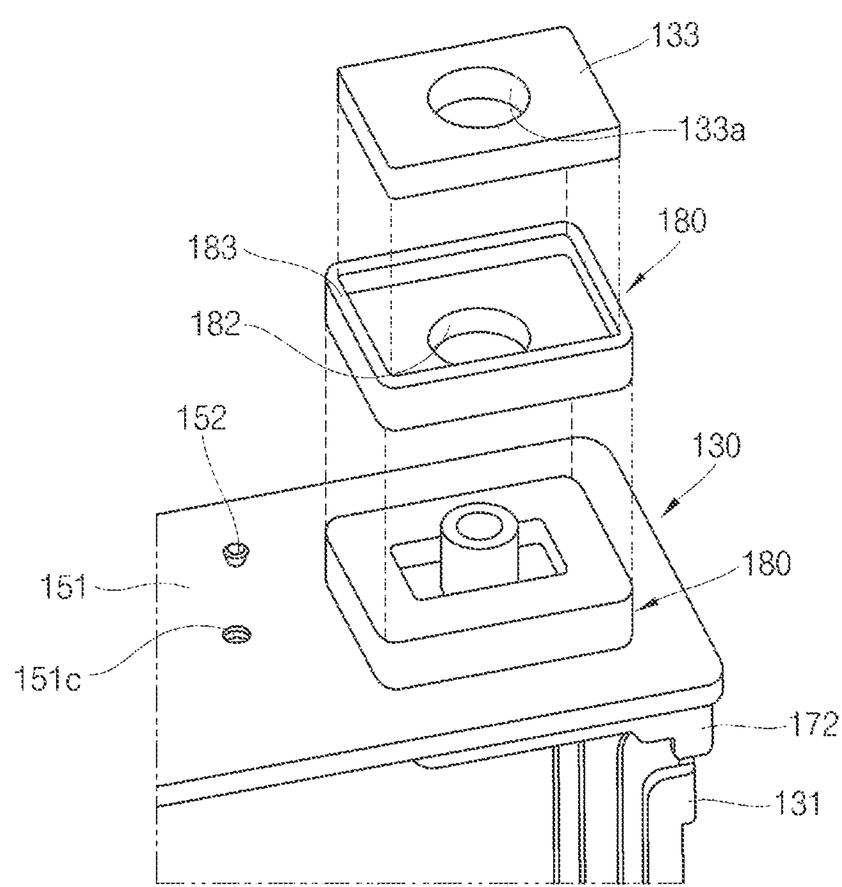
FIG. 5 is an exploded perspective view of FIG. 4.

FIG. 4 is a partial perspective view of an exemplary secondary battery according to an embodiment of the present invention. FIG. 5 is an exploded perspective view of FIG. 4.

As shown in FIGS. 4 and 5, the charging member 180 may be interposed between the cap plate 151 and the positive terminal 130. The charging member 180 may also be referred to as a resistive positive terminal. The charging member 180 may include a polymer and a conductive filler. For example, the charging member 180 may be formed by dispersing a conductive filler including at least any one of carbon black, carbon fiber, and carbon nanotubes or a combination thereof in a polymer including at least one of polyphenylene sulfide (PPS), polyacetylene (PA), polyphenylene vinylene (PPV), polypyrrole (PPY), polyaniline (PANI), polythiophene (PT), and poly3,4-etylenedioxythiophene (PEDOT), or a combination thereof. In some examples, the electrical resistance of the charging member 180 may be between approximately 1 kΩ and approximately 1000 MΩ. In addition, in some examples, when the polymer itself has conductivity, the conductive filler may be omitted. In some examples, when a conductive filler is dispersed in the polymer, the charging member 180 may be black.

As the second terminal 130 and the cap plate 151 are electrically connected by the charging member 180, the cap plate 151 and the case 140 may be positively charged. Therefore, an alloy (for example, a lithium aluminum (LiAl) alloy) may not be formed on the inner surface of the case 140 by an electrolyte containing lithium ions, thereby preventing corrosion on the inner surface of the case 140.

In addition, since the charging member 180 has a relatively high electrical resistance, even if the negative first terminal 120 is short-circuited to the positive case 140, the charging member 180 mainly consumes a short-circuit current. In some examples, when the first terminal 120 is short-circuited to the case 140 of the positive electrode, the charging member 180 mainly consumes energy of the battery 100, thereby preventing the secondary battery 100 from igniting.

The charging member 180 is positioned between the cap plate 151 and the second terminal 130, and may include a first protrusion 181 inserted into the cap plate 150 and a second protrusion 183 surrounding the terminal plate 133 of the second terminal 130. In addition, the first protrusion 181 of the charging member 180 may be coupled in a form that penetrates between the seal gasket 171 and the second protrusion 155, and the inner surface 182 thereof may maintain surface contact with the seal gasket 171. Accordingly, the sealing property of the secondary battery 100 may be improved through the charging member 180 and the sealing gasket 171.

In addition, the second protrusion 183 has a shape that protrudes upward along the edge of the charging member 180, and the second terminal plate 133 can be inserted and accommodated in the inner region of the second protrusion 183. In addition, in this case, since the lower side of the second terminal plate 133 is protected by being wrapped around the lower side of the charging member 180, the thickness required for stiffness can be reduced, compared to the conventional case. Accordingly, the weight of the secondary battery 100 can be reduced by reducing the thickness of the second terminal plate 133.

In addition, even in the case of the above-described insulating member 162, the insulating member 162 surrounds the lower side of the lateral side of the first terminal plate 123 in a shape corresponding to the charging member 180, the weight of the secondary battery 100 can also be reduced by reducing the thickness of the first terminal plate 123.

While the foregoing embodiment has been provided for carrying out the secondary battery according to the present invention, it should be understood that the embodiment described herein should be considered in a descriptive sense only and not for purposes of limitation, and various changes in form and details may be made therein without departing from the spirit and scope of the disclosure as defined by the following claims.

INDUSTRIAL APPLICABILITY

The present invention provides a secondary battery having enhanced durability, reinforced cap plate stiffness and reduced cell weight.

The invention claimed is:

1. A secondary battery comprising:

an electrode assembly;

a case for accommodating the electrode assembly;

a cap plate coupled to the case to seal the electrode assembly; and a terminal connected to the electrode assembly and exposed through the cap plate; and a protrusion of the cap plate protruding toward the terminal in an area in which the terminal of the cap plate is coupled, wherein a charging member is interposed between the cap plate and the terminal.

2. The secondary battery of claim 1, wherein the protrusion of the cap plate is formed along the periphery of the terminal passing through the cap plate.

3. The secondary battery of claim 1, wherein the charging member includes a first protrusion protruding downward and coupled to an inner side of the protrusion of the cap plate.

4. The secondary battery of claim 3, wherein the first protrusion of the charging member is coupled to a through-hole of the cap plate through which the terminal passes, inside the protrusion of the cap plate.

5. The secondary battery of claim 3, wherein the first protrusion of the charging member includes an inner surface in contact with a sealing gasket formed in the terminal or around the terminal.

6. The secondary battery of claim 1, wherein the charging member includes a second protrusion protruding upward along an edge thereof.

7. The secondary battery of claim 6, wherein the second protrusion of the charging member surrounds a lower portion of a side surface of the terminal plate exposed at an upper portion of the terminal to accommodate at least a portion of the terminal plate.

8. The secondary battery of claim 1, wherein the cap plate includes a groove corresponding to a height of the protrusion with respect to a lower region of the protrusion, and the sealing gasket coupled to the terminal may be coupled to the groove at a lower portion of the protrusion.

9. The secondary battery of claim 1, wherein the charging member includes a polymer and a conductive filler, and the polymer includes any one selected from the group consisting of polyphenylene sulfide (PPS), polyacetyl (PA), polyphenylene vinylene (PPV), polypyrole (PPY), PANI (polyaniline), PT (polythiophene), and poly 3,4-etylenedioxythiophene (PEDOT), and the conductive filler may include-any one selected from carbon black, carbon fiber, and carbon nanotube, or a combination thereof.

10. The secondary battery of claim 1, wherein the electrode assembly comprises a first electrode plate, a second electrode plate, and a separator between the first electrode plate and the second electrode plate.

11. The secondary battery of claim 10, wherein the first electrode plate is a negative electrode, and wherein the second electrode plate is a positive electrode.

12. The secondary battery of claim 10, wherein the terminal comprises a first terminal connected to the first electrode plate and a second terminal connected to the second electrode plate.

13. The secondary battery of claim 12, wherein the charging member is disposed between the second terminal and the cap plate.

14. The secondary battery of claim 12, wherein the second terminal is electrically connected to the cap plate.

15. The secondary battery of claim 12, wherein the first terminal is insulated from the cap plate.

16. The secondary battery of claim 12, wherein an insulating member is disposed between the first terminal and the cap plate.

17. The secondary battery of claim 16, wherein the protrusion of the cap plate comprises a first protrusion and a second protrusion, wherein the insulating member is coupled to an upper portion of the first protrusion, and wherein the charging member is coupled to an upper portion of the second protrusion.

18. The secondary battery of claim 1, wherein the electrical resistance of the charging member is between 1 kΩ and 1000 MΩ.

19. The secondary battery of claim 1, wherein the protrusion is a thickest portion of the cap plate.

* * * * *